(12) United States Patent
Goeth et al.

(10) Patent No.: US 11,768,480 B2
(45) Date of Patent: Sep. 26, 2023

(54) METHOD AND DEVICE OF PROVIDING A CONTROL COMMAND SET

(71) Applicant: EOS GmbH Electro Optical Systems, Krailling (DE)

(72) Inventors: Michael Goeth, Munich (DE); Martin Leuterer, Olching (DE)

(73) Assignee: EOS GmbH Electro Optical Systems, Krailling (DE)

( * ) Notice: Subject to any disclaimer, the term of this patent is extended or adjusted under 35 U.S.C. 154(b) by 337 days.

(21) Appl. No.: 16/967,003

(22) PCT Filed: Jan. 24, 2019

(86) PCT No.: PCT/EP2019/051727
§ 371 (c)(1),
(2) Date: Aug. 3, 2020

(87) PCT Pub. No.: WO2019/149612
PCT Pub. Date: Aug. 8, 2019

(65) Prior Publication Data
US 2021/0039322 A1 Feb. 11, 2021

(30) Foreign Application Priority Data
Feb. 5, 2018 (DE) .......................... 102018201739.5

(51) Int. Cl.
*G05B 19/4099* (2006.01)
*B29C 64/153* (2017.01)
(Continued)

(52) U.S. Cl.
CPC .......... *G05B 19/4099* (2013.01); *B22F 10/00* (2021.01); *B22F 10/28* (2021.01);
(Continued)

(58) Field of Classification Search
None
See application file for complete search history.

(56) References Cited

U.S. PATENT DOCUMENTS 5,137,662 A * 8/1992 Hull ...................... G01J 1/4257
118/712
6,622,062 B1 * 9/2003 Earl ...................... B33Y 50/02
700/193
(Continued)

FOREIGN PATENT DOCUMENTS

DE 10147947 4/2003
DE 102007058986 7/2009
(Continued)

OTHER PUBLICATIONS

Chu, Chen; Graf, Greg; Rosen, David W.: Design for additive manufacturing of cellular structures. In: Computer-Aided Design and Applications, 2008, vol. 5, No. 5, pp. 686-696. (English).
(Continued)

*Primary Examiner* — Jason Lin
(74) *Attorney, Agent, or Firm* — Seyfarth Shaw LLP

(57) ABSTRACT

Disclosed is a method for providing a control command set for an additive manufacturing device. The method includes providing a parameter set consisting of a number of parameters, and a construction rule, which is suitable for describing at least one section of the object by the parameter set geometrically as a number of linear or flat elements in space; generating a computer-based layer model of the section of the object by determining, for each layer, the position and shape of a cross-section of the section of the object within the layer, generating a control command set for an additive manufacturing device by which the production of the section of the object is implemented on the basis of the layer model.

15 Claims, 9 Drawing Sheets

(51) Int. Cl.
  *B29C 64/393* (2017.01)
  *B22F 10/00* (2021.01)
  *B22F 10/36* (2021.01)
  *B22F 10/85* (2021.01)
  *B22F 10/28* (2021.01)
  *B22F 12/44* (2021.01)
  *B22F 10/30* (2021.01)
  B33Y 10/00 (2015.01)
  B33Y 50/02 (2015.01)
  B22F 12/13 (2021.01)
  B22F 12/41 (2021.01)

(52) U.S. Cl.
  CPC .............. *B22F 10/30* (2021.01); *B22F 10/36* (2021.01); *B22F 10/85* (2021.01); *B22F 12/44* (2021.01); *B29C 64/153* (2017.08); *B29C 64/393* (2017.08); *B22F 12/13* (2021.01); *B22F 12/41* (2021.01); *B33Y 10/00* (2014.12); *B33Y 50/02* (2014.12); *G05B 2219/49018* (2013.01); *G05B 2219/49023* (2013.01); *G05B 2219/49029* (2013.01)

(56) References Cited

U.S. PATENT DOCUMENTS

| | | | |
|---|---|---|---|
| 6,980,629 B1 | 12/2005 | Hoheisel et al. | |
| 9,040,090 B2 * | 5/2015 | DeSimone | B29C 59/00 264/293 |
| 10,353,378 B2 * | 7/2019 | Shapiro | G05B 19/4099 |
| 10,538,074 B2 * | 1/2020 | Cortes | G05B 19/4099 |
| 10,807,305 B2 * | 10/2020 | Zhao | B22F 10/47 |
| 11,043,042 B2 * | 6/2021 | Del Angel | G06T 19/20 |
| 2003/0072415 A1 | 4/2003 | Eidam et al. | |
| 2007/0238056 A1 * | 10/2007 | Baumann | B29C 64/165 430/325 |
| 2009/0147923 A1 | 6/2009 | Kammel et al. | |
| 2009/0174709 A1 * | 7/2009 | Kozlak | B33Y 50/02 345/420 |
| 2011/0019801 A1 * | 1/2011 | Eichenseer | G21K 1/025 378/147 |
| 2013/0183494 A1 * | 7/2013 | Grebe | B29C 35/08 428/156 |
| 2015/0093516 A1 * | 4/2015 | Araga | C23C 24/106 118/44 |
| 2015/0328839 A1 * | 11/2015 | Willis | G05B 19/4099 700/98 |
| 2016/0082666 A1 * | 3/2016 | de Pena | B29C 64/393 700/98 |
| 2016/0209820 A1 * | 7/2016 | Banadyga | B29C 64/386 |
| 2017/0095337 A1 * | 4/2017 | Pasini | A61L 27/56 |
| 2017/0286567 A1 * | 10/2017 | Hana | B33Y 50/00 |
| 2018/0117836 A1 * | 5/2018 | Reese | B29C 64/118 |

FOREIGN PATENT DOCUMENTS

| | | | |
|---|---|---|---|
| EP | 1400982 | 3/2004 | |
| EP | 3094471 | 11/2016 | |
| WO | WO-2011091228 A1 * | 7/2011 | .......... B29C 64/106 |
| WO | 2015106836 | 7/2015 | |

OTHER PUBLICATIONS

International Search Report for Application No. PCT/EP2019/051727 dated May 16, 2019, 2 pages.

* cited by examiner

METHOD AND DEVICE OF PROVIDING A CONTROL COMMAND SET

TECHNICAL FIELD OF THE INVENTION

The invention refers to a method and a device of providing a control command set for the manufacture of at least one three-dimensional object by means of an additive manufacturing apparatus, to a respective manufacturing method and to a respective computer program.

BACKGROUND OF THE INVENTION

Additive manufacturing methods such as laser sintering or melting, stereolithography or 3D printing are characterized in that objects to be manufactured are manufactured layer by layer from a shapeless building material in that in each layer the cross-sections of the objects in this layer are generated by a solidification of the building material. By means of such methods, arbitrarily shaped objects may be manufactured based on a computer-based three-dimensional representation of an object, which representation has for example been generated by means of a CAD design program or has even been generated via a 3D scanning device. In spite of the manifold application possibilities of additive manufacturing methods, it turned out that for some objects to be manufactured there may be the problem that object details and dimensions cannot be realised with the necessary precision. An example for such an object is an anti-scatter grid for medical X-ray units, which is described in 10 2007 058 986 B3. Anti-scatter grids are radiation collimators that are often used in medical radiology in order to improve the contrast of the radiographs. FIG. 8 shows a typical setup as it exists in radiography in the medical field. The radiation 1010 of an X-ray source 1000 penetrates a body part 1020 in which the radiation is partially absorbed and then impinges on an X-ray detector 2000, which either is a film or a pixel detector. In particular, it can be seen that the radiation is emitted by the X-ray source 1000 with a small beam diameter and expands towards the detector 2000.

For a high image resolution, it is advantageous when the X-ray beams penetrate the object 1020 and hit the detector 2000 on a straight path. However, the resolution is considerably lowered by Compton scattering, due to which x-rays 1001 are deflected from their direction in the object 1020 without complete absorption. In order to obtain nevertheless an image with high resolution, an anti-scatter grid 1500 is placed between the object 1020 and the detector 2000, which anti-scatter grid shall absorb as completely as possible photons deflected by Compton scattering in the object. FIG. 9 shows very schematically the functioning of such an anti-scatter grid 1500. It can be seen that only rays 1010a proceeding as parallel as possible to the slit apertures or channels 1500a of the anti-scatter grid 1500 are not absorbed in the walls 1500b of the anti-scatter grid 1500 and reach the detector 2000.

In particular, if pixel detectors are used, the resolution that can be achieved is the larger the smaller the pixels are. This, however, leads to the fact that also an anti-scatter grid that is used should have a pitch as small as possible. Moreover, the image resolution increases with the so-called grid ratio, which is the ratio of the width of a slit aperture to its dimension in the direction of penetration. The dimension in the direction of penetration is also often designated as "height". Moreover, scattered rays should of course not be reduced only in one dimension but if possible in two dimensions perpendicular to each other. If it is additionally taken into account that the X-rays are not in parallel to each other when they hit the detector, it is apparent that the design of an anti-scatter grid may be very complicated. Accordingly, the production of such a complicated anti-scatter grid is very complicated, in particular, if the lamellae or walls of the anti-scatter grid are very thin and shall be very precisely spaced from one another, as in DE 10 2007 058 986 B3.

SUMMARY OF THE INVENTION

The object of the present invention is to provide an improved or alternative method and a respective device, by means of which objects—in particular preferably with increased precision and resolution of details—can be manufactured by means of a layer-wise additive manufacturing apparatus.

The object is achieved by a method of providing a control command set according to claim 1, a device for providing a control command set according to claim 10, a manufacturing method according to claim 11 and a computer program according to claim 15. Further developments of the invention are given in the dependent claims.

An inventive method of providing a control command set for an additive manufacturing apparatus for the manufacture of at least one three-dimensional object, wherein in the additive manufacturing apparatus the at least one object is manufactured layer by layer by the solidification of a building material at the positions that correspond to the cross-section of the object in a layer, comprises at least the following steps:
  providing a parameter set consisting of a number of parameters and a construction rule that is suitable to geometrically describe at least one portion of the object by means of the parameter set as a number, preferably a plurality, of line-shaped elements or area elements in space, which in the case of a plurality are particularly preferably similar, in particular identical,
  generating a computer-based layer model of the portion of the object in that for each layer the position and shape of a cross-section of the portion of the object in this layer is determined,
  generating a control command set for an additive manufacturing apparatus by which the manufacture of the portion of the object is implemented based on the layer model.

Layer-wise additive manufacturing apparatuses and methods to which the present invention refers are among others those in which energy is selectively supplied as electromagnetic radiation or particle radiation to a layer of a shape-less building material in order to solidify the same. Here, the energy is supplied by means of a laser or an electron beam source. However, also a UV light source as it is used particularly in stereolithography is conceivable. Accordingly, the beam is preferably a laser beam, an electron beam or a UV light beam. As the area of incidence of the radiation need not be punctiform, but may be an area, in the present application often the term ray bundle is used. Instead of selectively solidifying the applied building material by supplying energy, the solidification can also be effected by means of a 3D printing process, for example by selectively applying a glue by means of a glue jet. In general, it can be said that the invention is related to the additive manufacturing of an object by means of a layer-wise application and selective solidification of a shape-less building material independent of the way in which the building material is solidified.

At first, it shall be mentioned that the geometrically described at least one portion of the object can also comprise the whole object. Here, it shall also be mentioned that by means of an additive manufacturing apparatus not only one object but also several objects can be manufactured at the same time. If in the present application the manufacturing of an object is mentioned, then it goes without saying that the respective description is in the same way also applicable to additive manufacturing methods and apparatuses in which several objects are simultaneously manufactured.

Here, a control dataset (often also termed control command set) is regarded to be a sequence of instructions to subsequently apply layers of the building material and solidify the building material in that regions of the respective layers that correspond to the cross-section of the object(s) to be manufactured.

The control dataset specifies for each building material layer during the manufacture in particular the thickness of the layer application and the positions at which a solidification of the building material shall be effected by a supply of radiation. Thus, a control dataset also implicitly includes information on the position and orientation of the objects in the additive manufacturing apparatus. Also the diameter of an (energy) beam (ray bundle) when it impinges on the building material can be specified. Usually, the control dataset contains all data that are necessary for a control of the energy input device, whereby e.g. the energy density of the radiation and/or the velocity of movement of the beam across the building material and/or an irradiation pattern are specified.

Thus, the control dataset can be regarded as entirety of all control data that are specified for the control of the manufacturing process in an additive manufacturing apparatus. In the following, the control data related to a single layer are also referred to as layer dataset. In particular, in the present application it is assumed that a layer dataset contains a data model of positions of an object cross-section in the corresponding layer to be solidified during the manufacturing process. In the layer dataset, positions corresponding to an object cross-section that are to be solidified in the corresponding building material layer, are specified. Moreover, even further information with respect to the manufacturing of the object cross-section may be included such as the layer thickness or irradiation parameter values such as the diameter or the velocity of movement of a beam impinging on the building material, etc. It should be emphasised that it is also possible that a layer dataset does not refer to a total object cross-section but only to a portion of the same.

By the construction rule, a boundary condition can be specified for example in terms of an equation by which the shape and/or size and/or orientation and/or position of the object cross-section, in particular also of the total object, in space can be determined. Thereby, the object cross-section is described as a set of points, the positions of which in space can be determined by means of the construction rule. Examples for such construction rules are coordinate equations or parametric equations as they are known from analytic geometry for describing curves or surfaces in space. It should be noted that the terms "curve" or "line" are used in the present application in a mathematical sense, meaning the terms do not imply a line curvature but also comprise straight lines. Also, a surface in terms of the present application need not necessarily be plane but can also have a curvature in space.

A parameter set comprises a number of parameters, the numerical values of which are inserted as constants into the construction rule. Here, the term "number" is always understood to mean "one or more" in this application. If, for example, the construction rule consists of the equations $x=\cos(t)$ and $y=\sin(t)$, t will be the parameter in this system of parametric equations.

An example for an inventive description of an object (portion) by means of a construction rule and a parameter set would a.o. also be the specification of a dimension in one direction of space by a parameter. If the construction rule combines e.g. a specified base (e.g. a circle) with this parameter, e.g. a cylindrical object cross-section the height of which is specified by the parameter can be described by this. By changing the values of this parameter, the dimension of the object portion to be manufactured can be easily changed.

When a parameter set and a construction rule are provided, this means that for a description of the object portion, a parameter set and a construction rule are accessed which are stored in a digital memory within or outside of the additive manufacturing apparatus or on a portable storage medium or which are explicitly specified by a user of the additive manufacturing apparatus at an input terminal.

According to the invention, when generating the layer model that includes a number of layers, it is not necessary to access a description in terms of a CAD model, in particular a volume model, surface model or edge model, of the object portion and object, respectively, to be manufactured. As a result, objects having more precise dimensions of details can be manufactured:

Each description of an object by means of a CAD model in fact describes the shape of the object only approximately. For example, in the description using the STL format, the surface of the object is approximated by plane triangles of different sizes. However, specifically for curved surfaces, deviations between the positions of the corner points of a triangle and the surface to be described will occur, which deviations will lead to an imprecise description of the object shape. If the object to be manufactured is manufactured based on such a model which in fact is imprecise, the resolution of details and the precision of the manufacture, respectively, encounter limitations. Indeed, the precision of the model can be increased by making the triangles smaller. However, this also leads to a considerable increase of the data volume required by the model, which in turn leads to long times for the generation of control datasets and layer data sets, respectively, needed for the manufacture of the object.

By using a construction rule for specifying the positions of an object cross-section to be solidified in a layer, the manufacturing method is relieved from limitations that result from a limited position resolution in the description by means of a CAD volume model of the object to be manufactured. Due to the use of the construction rule, the size, shape, orientation or position of an object (portion) in space can be exactly specified without being impaired by the "granularity" of the model. Thus, the resolution of object details or the precision with which distances of object details from each other can be realised does no longer depend on deficiencies of the model. It shall particularly be emphasised that for the manufacture of objects according to the invention a CAD model of the object need not necessarily exist. It is sufficient, if for a given problem the geometrical boundary conditions for the shape and for the dimensions of the object are specified in terms of parameters. This widens the spectrum of objects that can be manufactured by means of an additive manufacturing method considerably and also leads to a simplification that is not inconsiderable.

In particular, by means of the construction rule and the parameter set, objects (object portions) can be described in terms of "thread models", in that no massive object is specified but the object (in particular its surface) is defined by a number of line-shaped elements. It should be noted that such an approach does not lead to losses in detail precision as the line-shaped elements are exactly described by means of a construction rule. As the invention turns away from specifying the manufacture of a massive object, the size of the control dataset can be reduced, which makes the manageability of data easier, particularly for more complicated or larger objects. Furthermore, by the approach that has been chosen, it is possible to make changes of the geometry in a simple way in that only the values of a number of parameters are changed. Thereby, a complete new calculation of a complete data model of an object (portion) becomes unnecessary. Due to a description of an object portion only by means of line-shaped elements or area elements (in contrast to a description by means of volume elements) it is possible to easily specify in an additive manufacture of the object portion the positions to be solidified by the construction rule. Nevertheless, in the inventive approach, the manufacturing of massive object portions is possible by specifying the distance of line-shaped elements or area elements with respect to each other and/or the diameter of the solidification region (e.g. the region on the building material on which the radiation used acts on).

The position and, if necessary, also the shape of a line-shaped element in space can be specified by the construction rule and the width of the line-shaped element can be specified by one or more parameters. The value of the respective parameter could e.g. correspond to the minimum settable diameter of the area of incidence of a beam in the additive manufacturing apparatus or a multiple of the same. It is also possible to specify the width of the line-shaped element not by a parameter. For this case, the stipulated procedure could be that in the manufacturing process in the additive manufacturing apparatus the line-shaped element is to be scanned with the minimum settable diameter of the area of incidence of a beam.

The construction rule may in particular describe the geometrical arrangement of a plurality of similar, preferably substantially identical, line-shaped elements or area elements in space. Here, in the present application the term "similar" expresses a substantially identical geometrical shape (for example a rectangular shape). According to this understanding, from a substantially identical geometrical shape do not necessarily result identical dimensions.

When layer data for a control command set are generated based on a construction rule, such an approach is particularly suitable for objects and object portions, respectively, having structure elements that are repeated in space. Here, it is not necessarily only a single structure element (e.g. a line-shaped element or area element) for which a multiple arrangement in space is specified. It is also conceivable that by the construction rule the multiple arrangement in space of a plurality of structure elements differing from one another is specified, for example the alternating arrangement of two different structure elements.

Preferably, the construction rule specifies a shift for one or more times of a line-shaped element or area element in a first direction in space and/or in a second direction in space that preferably is perpendicular to the first direction in space. In particular, the construction rule can specify a shift for one or more times of a line-shaped element or area element in a first direction in space and/or in a second direction in space that preferably is perpendicular to the first direction in space.

Here, a shift does not imply that the line-shaped element or area element is merely shifted, but that at the position resulting from the shift a copy of the line-shaped element or area element with a similar, preferably identical, shape is specified.

For example, one- or two-dimensional grids in space can be specified by such a construction rule. A lattice spacing in the first direction in space could for example be defined by the value of a first parameter and an optional lattice spacing in the second direction in space could for example be defined by the value of a second parameter. In particular, in a multiple shift the distance between two adjacent line-shaped elements or area elements need not be constant, but may vary in accordance with a set of first parameter values and second parameter values, respectively, contained in the parameter set.

Further preferably, the construction rule specifies a rotation of a line-shaped element or area element for one or more times.

A rotation means here that the line-shaped element or area element is rotated about a predetermined axis in space by one or more angles specified as parameters. In doing so, at each position resulting from the rotation, a copy of the line-shaped element or area element with a similar, preferably identical, shape is specified. For example, by the construction rule, a ruled surface could be described, e.g. a hyperboloid of revolution that is described by means of a straight-lined segment (i.e. a line-shaped element) about an axis that is skew to it.

Further preferably, two line-shaped elements or area elements differ from one another in at least one dimension by a scale factor that is specified as parameter.

The description of objects by means of parameters is particularly simple when there exist structure elements identical with each other or structure elements similar to each other in the objects. In such a case, only the appearance of such a structure element must be exactly described and the positions of the structure elements that exist as a multitude are then specified by a limited number of scale parameters and orientation parameters. Again, the considerable simplification against the ordinary case, in which an STL or CAD format is used, in which each individual structure element has to be approximated separately, can be seen.

By such an approach, a cone or truncated cone can be easily described, which cone or truncated cone is described by the construction rule using the height and the scale factor that both are specified as parameters, e.g. in that a circular base area is specified and the scale factor determines the difference in size between two adjacent circles.

Further preferably, the geometrically described portion of the object is made up only of line-shaped elements at least within one layer.

As already mentioned further above, a line-shaped element is a region having a diameter in a direction perpendicular to the "line", which diameter is in the order of magnitude of the diameter of the beam used for the solidification of the building material when it impinges on the building material. Particularly when the dimensions of object portions and/or distances of details in these object portions get into this order of magnitude, a volume model used for the object description such as a model in which the surface of the part is approximated by plane triangles that differ in size as in the STL or CAD format (in the following a.o. this also means a volume CAD format) often does no longer provide the necessary detail resolution without an exorbitant increase of the size of the data sets and an exorbitant increase of the processing times when converting the data.

Further preferably, at least one parameter specifies a, preferably geometrical, boundary condition in the use of the finished object.

Parameters may also refer only indirectly to the geometry of the object (portion) to be manufactured in that parameters specify boundary conditions at the site of use of the object to be manufactured, which boundary conditions immediately result in a determination of a shape, dimension, position or orientation of the object (portion). For known problems, the determination of the resulting geometrical parameters of the object (portion) such as shape, dimension, position or orientation can be implemented by the inventive method itself. In an anti-scatter grid, an example for a parameter that results from the intended use of the object to be manufactured and that determines the geometry of the object to be manufactured would be the distance of the radiation source from the detector configuration.

Further preferably, the portion of the object is a collimator having a plurality of raster elements used for blocking radiation, preferably a collimator for the use in a radiation unit between a radiation source and a detector configuration, and the construction rule uses for the geometrical description of the collimator the following parameters: the number of raster elements and/or the distance between the same and/or the distance of the radiation source from the detector configuration.

By the approach according to the invention, arbitrary objects can be manufactured, the geometry of which can be geometrically described by a number of parameters and a construction rule. Due to the high demands to detail resolution and to precision, the realisation based on the inventive approach of a collimator that is used between a radiation source and a detector configuration is particularly suitable.

Further preferably, the collimator is an anti-scatter grid for the use in an X-ray unit and the raster elements are plane walls or portions of cylindrical surfaces in parallel to each other.

The use of the invention in combination with an x-ray unit is of advantage because usually it is easier to block x-rays as compared to for example gamma-rays. Moreover, particularly for x-ray units there have been achieved detail resolutions which make necessary the use of anti-scatter grids that have a very small lattice spacing. If the radiation source is a medical x-ray source, the collimator usually is named anti-scatter grid. However, also a use is possible in non-medical applications or in applications in which, in particular in imaging methods, other rays such as gamma or particle rays are used, for example in nuclear medicine, is conceivable.

Further preferably, the collimator is an anti-scatter grid for the use in a medical X-ray unit and the raster elements are a plurality of rods or plane walls or portions of cylindrical surfaces, which according to the construction rule are aligned according to the rays of the ray cone emitted from the X-ray source towards the detector configuration.

An alignment of raster elements according to rays may in particular also be a parallel alignment. In particular for a focusing anti-scatter grid, a conventional manufacturing is very difficult as an exact alignment in two dimensions of the absorbing walls of the anti-scatter grid is necessary. In the inventive manufacture of such an anti-scatter grid, the manufacture of a focusing anti-scatter grid does not become more complicated.

On the one hand, this relates to additive manufacturing, on the other hand, however, this also relates to the precise description of the anti-scatter grid by a construction rule.

An inventive device for providing a control command set for an additive manufacturing apparatus for the manufacture of at least one three-dimensional object, wherein in the additive manufacturing apparatus the at least one object is manufactured layer by layer by the solidification of a building material at the positions that correspond to the cross-section of the object in a layer, comprises at least:
- a provision unit (201), which in operation provides a parameter set consisting of a number of parameters and a construction rule that is suitable to geometrically describe at least one portion of the object by means of the parameter set as a number, preferably a plurality, of line-shaped elements or area elements in space, which in the case of a plurality are particularly preferably similar, in particular identical,
- a layer model generation unit (202), which in operation generates a computer-based layer model of the portion of the object in that for each layer the position and shape of a cross-section of the portion of the object in this layer is determined, and
- a control command set generation unit (203), which in operation generates a control command set for an additive manufacturing apparatus by which the manufacture of the portion of the object is implemented based on the layer model.

The provision unit may be an input interface which is able to read data from a mobile data carrier or is able to receive data via a network or else to receive data directly from an input interface for a user. As the device for providing control commands can in particular be implemented not only as separate unit but may also be a component of a larger EDP system (e.g. a CAD design system) or of an additive manufacturing apparatus, the provision unit may also simply be a software interface communicating with the other system components. The network may be a LAN or may be the Internet.

What was just said applies in the same way to the control command set generation unit. In particular, control commands from the same may be communicated via a network to an additive manufacturing apparatus that is at a distance from the device for providing control commands. In particular, if the device for providing control commands is integrated into an additive manufacturing apparatus, a data transmission via a bus system or via a common memory is also possible.

In an inventive manufacturing method for the manufacture of at least one three-dimensional object by means of an additive manufacturing apparatus, wherein in the additive manufacturing apparatus the at least one object is manufactured layer by layer by the solidification of a building material at the positions that correspond to the cross-section of the object in a layer, for the manufacturing process the manufacturing apparatus is driven by a control command set provided by a method according to the invention.

By the inventive manufacturing method, objects can be manufactured by a layer-wise additive manufacturing apparatus with increased precision and detail resolution without any limitation by the resolution of an STL or CAD data format describing an object.

An inventive control device of a solidification unit, in particular an energy input unit as it is used in an additive manufacturing apparatus for the manufacture of at least one three-dimensional object, wherein in the additive manufacturing apparatus the at least one object is manufactured layer by layer by the solidification of a building material at the positions that correspond to the cross-section of the object in a layer, comprises a parameter receiving unit that is configured to receive a parameter set consisting of a number of parameters. Furthermore, the control device comprises a control unit that is configured to drive the solidification unit such that it solidifies the positions in a building material layer corresponding to an object. Here, the control device determines positions corresponding to at least a portion of the object based on a construction rule that is able to geometrically describe at least a portion of the object by means of the parameter set as a number of (in particular similar, preferably identical) line-shaped elements or area elements in space.

Thus, the mentioned control device may in particular effect the additive manufacturing of an object (portion) only based on a given parameter set without the necessity of accessing an explicit data model that characterises the object portion by means of geometrical primitives (triangles, points) in all details. In particular, all positions to be solidified of the object to be manufactured can be solidified in this way. In particular, the control device can also be integrated in an additive manufacturing apparatus that comprises the solidification unit to be controlled. Of course, the additive manufacturing apparatus may also comprise a plurality of solidification units that are controlled by the control device.

Preferably, in the method of providing the control command set the layer model is dynamically generated, meaning for at least one layer the position and shape of a cross-section of the portion of the object in this layer is determined only after the start of the manufacturing process.

In this variation of the manufacturing method, no complete control command set has to be generated before the start of the manufacturing process. The dynamic generation of the information necessary for each layer is very simple in the inventive approach because the amounts of data to be processed are very small due to the description of the object and object cross-section, respectively, by a construction rule and a parameter set.

Further preferably, in the manufacturing method for a solidification of the building material, heat energy is supplied to the building material by means of an electromagnetic ray bundle or particle ray bundle and, when in the layer model a cross-section of an object portion is described by one or more line-shaped elements, this cross-section is solidified by scanning the line-shaped element(s) in the direction of the course of the line with the electromagnetic ray bundle or particle ray bundle one or more times.

Even if for the manufacture of a high-precision object such as an anti-scatter grid a 3D printing method may be used, a sintering or melting method using electromagnetic radiation or particle radiation is suitable, in particular when the raster shall be manufactured from a material that absorbs x-rays very well. Here, in particular elements having a high atomic number Z, for example molybdenum powder or tungsten powder, etc. or mixtures of the same or alloys are a possibility. For example, a metal powder containing tungsten or titanium can be used as building material, preferably a Ti6Al4V powder. Furthermore, also materials containing lead, bismuth, strontium, cadmium or indium, which need not necessarily be powders, are suitable.

Then, in particular very delicate regions of an object cross-section such as line-shaped elements can be manufactured very precisely, if the ray bundle supplying the energy is moved substantially only in the direction of the line-shaped element. The reason for this is that for a movement perpendicular to the line-shaped course, the ray bundle may be active only for a very short time. Thus, the minimum dimension of a line-shaped element perpendicular to the line that can be obtained is severely limited by the properties of the additive manufacturing apparatus and depends for example on how large an acceleration and deceleration can be when the area of incidence of the ray bundle is moved across the material.

Even further preferably, in the manufacturing method the width of a line-shaped element after its solidification is adjusted by adjusting the mean energy density per unit area in the area of incidence of the ray bundle and/or by adjusting a dimension of the ray bundle in the direction of the width of the line-shaped element and/or by adjusting the velocity with which the electromagnetic ray bundle or particle ray bundle scans the line-shaped element(s) in the direction of the course of the line.

A line-shaped element which may be straight as well as curved and in which a dimension perpendicular to the course of the line is in the order of the area of incidence of the ray bundle can be manufactured with a width as small as possible, particularly if the beam moves over it only once in the direction of the course of the line, wherein the width of the line-shaped element is substantially adjusted by adjusting the radiation energy per unit area which on average is supplied to the building material and/or the width of the area of incidence of the radiation on the building material, e.g. by adjusting the focus.

Alternatively, the width of a line-shaped element may be adjusted by a repeated scanning of the line-shaped element with a ray bundle along the course of the line. Here, preferably, the individual scanlines are displaced, however, also without a displacement the width of the solidified line-shaped element, meaning its extension perpendicular to the course of the line will, be the larger the more often the ray bundle scans the line. It should be noted that for a repeated scanning of a line-shaped element, the energy input parameters such as a power that is set at the radiation source or a focus diameter (diameter of the area of incidence of the radiation on the building material) may differ from scan to scan. For example, there may be scans for preheating the building material or for delaying the cooling-down of the building material.

In a preferred variation of the manufacturing method, an additive manufacturing apparatus is used in which the solidification of the building material is effected by means of an electromagnetic ray bundle or particle ray bundle directed onto the same, wherein the electromagnetic ray bundle or particle ray bundle incident onto the building material has a maximum diameter equal to or smaller than 500 μm, preferably equal to or smaller than 200 μm, more preferably equal to or smaller than 100 μm, further preferably equal to or smaller than 80 μm, even further preferably equal to or smaller than 50 μm.

The resolution of geometric details that can be achieved by means of a layer-wise additive manufacturing method, in particular a selective laser sintering or laser melting method, depends a.o. on the beam parameters (or ray bundle parameters) such as the laser power, the diameter of the beam (ray bundle), the shape of the area of incidence of the beam (ray bundle) on the building material, the power distribution within the area of incidence, etc. Accordingly, the use of a control command set that has been provided according to an inventive method, which control command set allows for a manufacture with increased precision and detail resolution makes sense in particular in those additive manufacturing methods and apparatuses in which constructive measures, here in addition to the above the use of a pulsed laser is mentioned as example, and respective modes of operation, e.g. the sequence in time and space of the exposure of the individual positions of an object cross-section, the temporal and spatial variation of the beam power (e.g. by changing the pulse frequency, the pulse height, the duty factor, etc. for a pulsed laser) provide for an increased precision and detail resolution.

Here, the detail resolution that can be achieved will in particular be influenced by the diameter of the beam. Therefore, the invention is in particular of advantage in those manufacturing methods and apparatuses, in which a beam having a small diameter is used for the solidification of the building material. Assuming the beam profile to be Gaussian, the mentioned diameter of the beam, more precisely of the area of incidence of the same on the building material, can be defined for example as diameter of that region, inside of which the beam power is above of the maximum beam power divided by $e^2$, where e is Euler's number.

Furthermore, in the preferred variation of the manufacturing method, a powder containing a polymer can be used as building material and the electromagnetic ray bundle can be generated by means of a carbon monoxide laser.

The radiation emitted by a carbon monoxide laser comprises the wavelength region between 4 μm and 8 μm. It therefore lies below the wavelength of 10.6 μm, which is primarily emitted by a carbon dioxide laser that is usually used for the solidification of building materials containing polymers in additive manufacturing methods. Therefore, when using a carbon monoxide laser, a better resolution of details can be obtained.

In particular, when carbon monoxide lasers are used, an electroacoustic or electro-optical modulator can be used for the modification of the radiation power, in particular for switching it on and off. The mentioned modulators are particularly suitable for effecting fast switching operations, in particular a fast switching and modification, respectively, of the laser radiation supplied to the building material. Here, preferably, the zeroth order of the laser radiation that is penetrating the laser power modification device is supplied to the positions in each layer, that are assigned to the cross-section of the object in this layer in order to solidify the building material. Accordingly, when the supply of radiation is switched off, energy from the zeroth order is substantially redirected to the higher orders.

Furthermore, in the preferred variation of the manufacturing method, a powder containing a metal and/or a ceramic is used as building material, where the electromagnetic ray bundle or particle ray bundle acts on the building material such that a conduction welding process is effected.

From laser beam welding, two basically different modes of operation are known, which can also be used in selective laser melting: keyhole welding and heat conduction welding. Here, a heat conduction welding processes is considered to be a process in which the radiation power per unit area that is input into the building material by the radiation is too small to effect an evaporation of the building material. The energy then spreads into the building material via heat conduction leading to a smaller extension of the melt pool created by the radiation perpendicular to the surface. The type of welding process can be determined e.g. by observing the interaction region of the radiation by means of a camera (optical, IR, UV), by analysing the radiation emitted from the interaction region of the radiation or else by analyses of test objects manufactured in pre-tests. For example, the substantial absence of emissions that are caused by the vapour capillary generated in the keyhole welding process, thus splashes or jets as well as metal vapour, can be used as a criterion for the presence of a heat conduction welding process. A further criterion is the ratio of the diameter of the beam to the depth extension of the melt trace, which for heat conduction welding is above of 1:1, in an optimum case 2:1 or larger, e.g. 3:1 or larger or 4:1 or larger, but in any case below 100:1. Moreover, also the surface temperature of the building material can serve as criterion. If the latter is below the evaporation point of one or of all components of the building material, the "keyhole" that is typical for the keyhole welding process is not able to form.

Due to the nature of the heat conduction welding process, it is particularly advantageous when objects having a high detail resolution in the direction in which the building material layers are stacked upon one another ("z direction") shall be manufactured. Thus, in particular when e.g. thin walls of the object shall be manufactured which are during their manufacture not perpendicular to the building material layers (meaning to the working plane), the use of the heat conduction welding mode in the solidification of the building material is of advantage. In such a case, the thickness of the wall has a component perpendicular to the building material layers. From the smaller penetration depth of the laser radiation and the smaller depth extension of the melt pool, respectively, then results a smaller extension of the region solidified by the action of the radiation onto the building material in heat conduction welding, so that the component of the wall thickness perpendicular to the building material layers is smaller and smaller wall thicknesses can be obtained. The mentioned approach is particularly advantageous when for the manufacture of a wall the area of incidence of the beam is moved over the building material layer along the course of the wall, meaning along the line-shaped element that corresponds to the cross-section of the wall assigned to this building material layer. The minimum wall thickness that can be obtained then depends on the minimum obtainable extension of the solidification region, meaning that region in which by the action of the radiation a coalescence, in particular a fusion, of powder grains is effected. The smaller the angle between a wall to be manufactured and the working plane and the plane of the building material layer, respectively, the larger will be the advantage that is potentially achievable by the heat conduction welding mode. The greatest benefit will be for walls and wall portions, respectively, to be manufactured that are in parallel to the working plane during their manufacture by a solidification of building material.

Furthermore, in the preferred variation of the manufacturing method, the ray bundle or particle ray bundle incident on the building material has a maximum diameter that is equal to or smaller than 30 μm.

A high resolution of details is in particular necessary for objects to be manufactured for which an overall size in at least one dimension is small. Accordingly, the use of a control command set provided by a method according to the invention is in particular advantageous for the manufacture of particularly small, thin and/or flat objects. Here, the maximum dimension of the object to be manufactured in at least one dimension may in particular lie below 1 mm, from which it is apparent that the area of incidence of the ray bundle or particle ray bundle on the building material should preferably have a maximum dimension equal to or smaller than 30 μm.

A computer program according to the invention comprises a sequence of commands, which when being executed implement a method of providing a control command set according to the invention and/or a manufacturing method according to the invention.

Here, the computer program according to the invention may run either on the layer-wise additive manufacturing apparatus itself (for example in a control unit of the same) or else may run for example in a CAD design system or else in a dedicated data processing device.

BRIEF DESCRIPTION OF THE DRAWINGS

In the following, the invention will be described with the aid of the drawings. Here, features that are mentioned in connection with one claim category in the dependent claims and in the following or foregoing description may also be used for a further development of subject-matters of any other claim category, unless this is explicitly excluded. As to the figures, these show:

DETAILED DESCRIPTION OF THE EMBODIMENTS

The present invention originated in connection with the idea of manufacturing a radiation collimator, in particular an anti-scatter grid, by means of an additive manufacturing method in a more precise and simpler way. Therefore, in the following the approach according to the invention is described in connection with the manufacturing of an anti-scatter grid by an additive manufacturing process.

Figure 1:
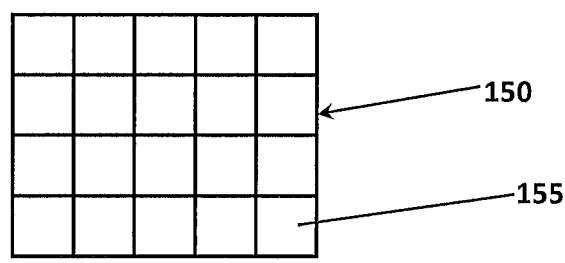
FIG. 1 a top view of the radiation entrance surface of an anti-scatter grid that can be manufactured according to the invention, FIG. 2 a schematic enlarged view of details of the anti-scatter grid of FIG. 1, FIG. 3 a schematic partially cross-sectional view of an exemplary apparatus for an additive manufacture of a three-dimensional object, FIG. 4 an illustration of a focusing anti-scatter grid that can be manufactured according to the invention, FIG. 5 a diagram for illustrating the orientation of the channel walls in a focusing anti-scatter grid, FIG. 6 a vertical cut through walls of an anti-scatter grid perpendicular to the wall for illustrating support structures according to a particular embodiment of the invention, FIG. 7 a diagram, which schematically shows the setup of an embodiment of an inventive device for providing a control command set, FIG. 8 a schematic representation of the setup when a radiograph of an object is made, and FIG. 9 a schematic illustration of the mode of operation of an anti-scatter grid.

FIG. 1 shows a top view of an anti-scatter grid 150 that can be manufactured according to the invention. The top view illustrates the radiation entrance surface of the radiation used for the examination of an object into the anti-scatter grid. The anti-scatter grid consists of a number of channels 155 having a rectangular cross-section that are joined to form a grid. It has a height h in the direction that is perpendicular to the drawing plane of FIG. 1. In an application, the x-ray radiation penetrated the grid in parallel to the height h.

Figure 2:
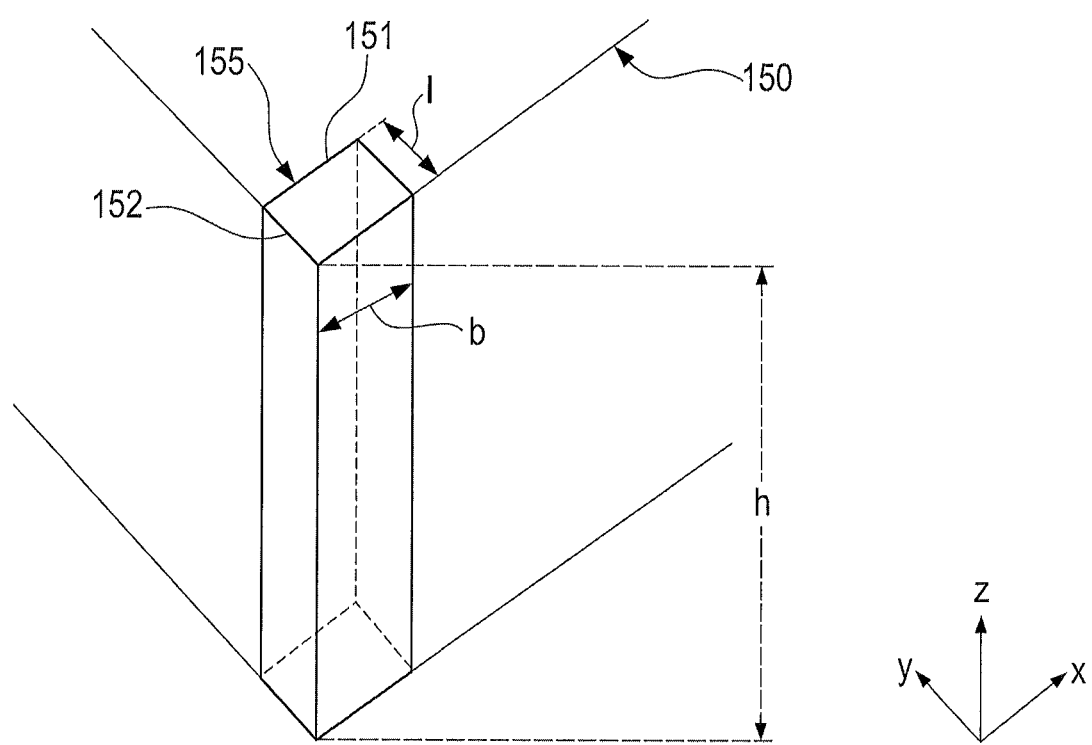

In FIG. 2, a single grid cell of the anti-scatter grid 150 is shown enlarged. Here, one side of a channel 155 that is shown is designated with b, indicating the width of the channel opening, and the other side is designated with l, indicating the length of the channel opening. The wall that is in parallel to the width of the channel cross-section has been provided with reference number 151 and the wall that is in parallel to the length of the channel cross-section has been provided with reference number 152.

Due to the use of an additive manufacturing method for manufacturing such an anti-scatter grid, it is possible to manufacture an anti-scatter grid having wall thicknesses in the range of approximately 100 µm with an exemplary length and width of a channel cross-section of 2 mm and 3 mm, respectively and an exemplary height h of 30 mm. In order to achieve that the anti-scatter grid lets pass as few scattered radiation as possible and in order to achieve that the anti-scatter grid shows a uniform behaviour across the whole surface through which the radiation passes, it is necessary to manufacture all dimensions with high precision, if possible with variations in dimension that are smaller than 10 µm.

Here, in order to be able to fulfil the high demands with regard to precision, the generation of an STL dataset or CAD dataset of the anti-scatter grid to be manufactured is set aside. Rather, the object to be manufactured, in this case the anti-scatter grid, is defined by the specification of parameters and of a construction rule of how to be able to determine the geometrical shape of the object to be manufactured based on the parameters. Here, for the manufacturing of the anti-scatter grid, specifications for the following parameters are necessary:

The height h of the anti-scatter grid,
the number NX of the walls 152 in parallel to the length l of a channel (assuming that the x direction is extending in parallel to the channel width b as shown in FIG. 2),
the number NY of the walls 151 in parallel to the width b of a channel (in FIG. 2, the y direction extends in parallel to the length l of a channel),
the pitch in x direction PX,
the pitch in y direction PY,
the thickness of a wall in parallel to the channel width b,
the thickness of a wall in parallel to the channel length l,
(optionally) the orientation of the anti-scatter grid in the additive manufacturing apparatus during its manufacture.

From the above it results that the extension of the walls 151 in parallel to the width b of a channel substantially equals $PX \cdot (NX-1)$ and that the extension of the walls in parallel to the length l of a channel substantially equals $PY \cdot (NY-1)$. Note that the pitch PX of the walls 152 differs from the width b of a channel opening due to the wall thickness. The same applies to the pitch PY and the length l of a channel opening.

The above specifications are sufficient for defining the geometry of the anti-scatter grid with arbitrary precision without being limited in precision by the positions of the triangulation points in an STL representation of the surface. Changes to the geometry can be simply made by changes to the parameters: for example, the width b of the channel openings can be made equal to the length l of the channel openings. Furthermore, the wall thickness may be changed in a simple way. Moreover, also non-rectangular channel cross-sections can be often described by simple geometrical specifications (e.g. for hexagonal channel cross-sections or circular channel cross-sections).

The geometrical information for describing the anti-scatter grid can be obtained from the specified parameters by a simple construction rule. For example, the coordinates of the individual walls of the anti-scatter grid do simply result from repeatedly shifting a wall in parallel by the pitch PX or PY.

In the approach described here, the information related to the individual layers in a control command set of an additive manufacturing apparatus used for the manufacture of the anti-scatter grid can be calculated from the specified parameters and the construction rule in a simple way.

Then, by the control command set generated according to the above method, the anti-scatter grid can be manufactured by means of the additive manufacturing apparatus, such as a laser sintering or laser melting apparatus in the usual way. Substances with high atomic number Z lend themselves as preferred building materials as these absorb radiation particularly well. For example, a metal powder containing tungsten or titanium could be used as building material, preferably a Ti6Al4V powder.

Figure 3:
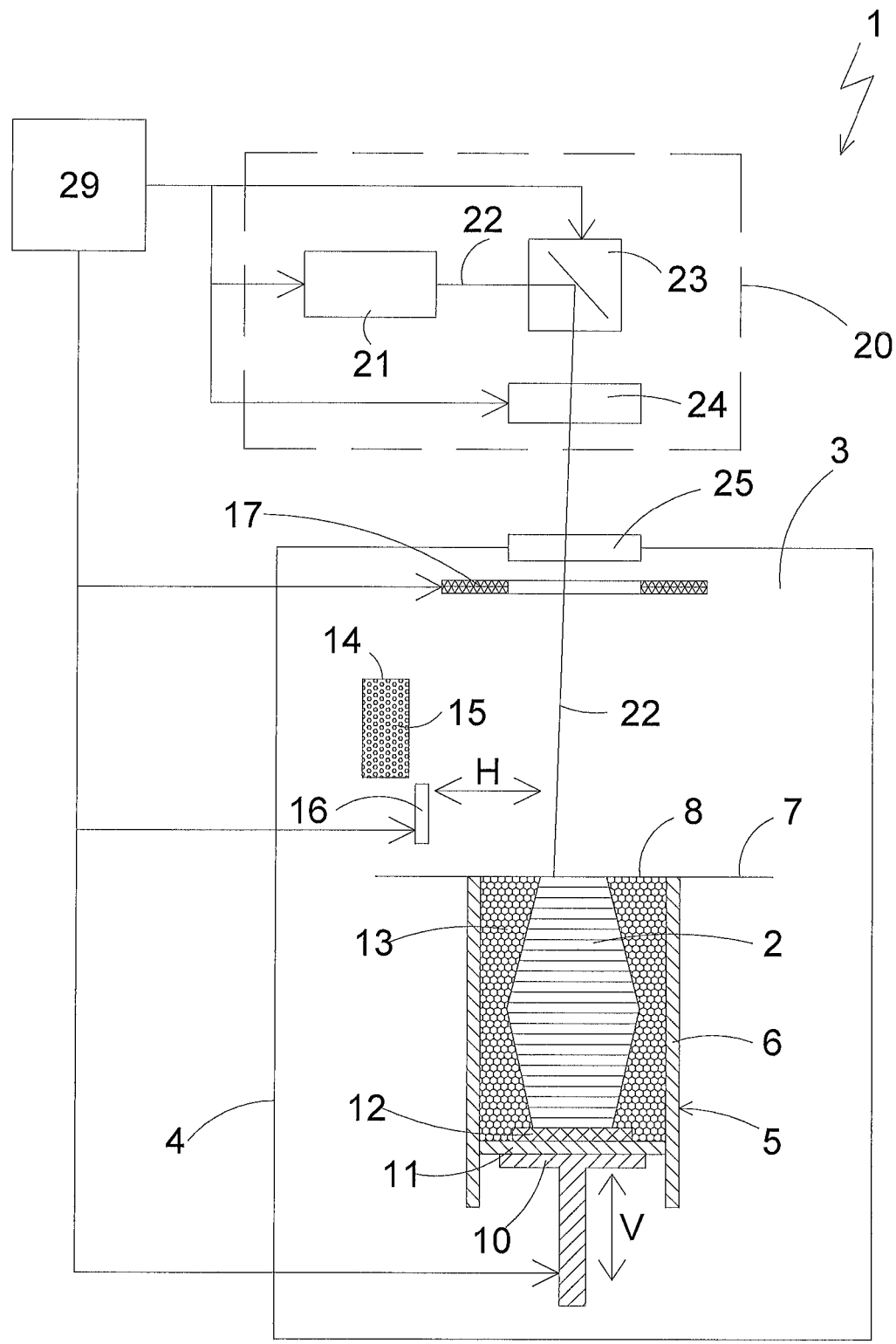

With reference to FIG. 3, in the following a laser sintering or laser melting apparatus 1 is described as example of an additive manufacturing apparatus by means of which a three-dimensional object such as an anti-scatter grid can be manufactured according to the invention.

For building an object 2, this layer-wise additive manufacturing apparatus contains a process chamber 3 with a chamber wall 4. A container 5 open to the top having a container wall 6 is arranged in the process chamber 3. The vertical position of the top opening of the container 5 defines a working plane 7, wherein the area of the working plane 7 located within the opening, which area can be used for building the object 2, is referred to as build area 8.

In the container 5, a support 10 is arranged that can be moved in a vertical direction V and to which a base plate 11 is attached which seals the container 5 at the bottom and thus forms the bottom thereof. The base plate 11 can be formed as a plate separately from the support 10, which plate is fixed to the support 10, or it can be integrally formed with the support 10. Depending on the powder and process used, a building platform 12 can be additionally arranged on the base plate 11 as building support, on which building support the object 2 is built. However, the object 2 can also be built on the base plate 11 itself, which then serves as a building support. In FIG. 1, the object 2 to be formed in the container 5 on the building platform 12 is shown below the working plane 7 in an intermediate state with several solidified layers, surrounded by building material 13 that remained unsolidified.

The laser sintering apparatus 1 further comprises a storage container 14 for a building material 15 in powder form that can be solidified by electromagnetic radiation and a recoater 16 that can be moved in a horizontal direction H for applying the building material 15 within the build area 8. in order to achieve layer thicknesses as small as possible when a building material layer such as powder is applied, besides blades or rollers also a brush can be used for the powder application.

Optionally, a radiant heater 17 is arranged in the process chamber 3, which serves for a heating of the applied building material 15. For example, an infrared heater may be provided as radiant heater 17.

The laser sintering apparatus 1 further comprises an energy input unit 20 having a laser 21 generating a laser beam 22 that is deflected by a deflection device 23 and focused by a focusing device 24 on the working plane 7 through a coupling window 25 that is arranged at the top side of the process chamber 3 in the chamber wall 4.

Furthermore, the laser sintering apparatus 1 comprises a control unit 29 by which the individual components of the apparatus 1 can be controlled in a coordinated manner in order to carry out the building process. Alternatively, the control unit can also be arranged partially or completely outside of the apparatus. The control unit can comprise a CPU, the operation of which is controlled by a computer program (software). The computer program can be stored separately from the apparatus on a storage medium from which it can be loaded into the apparatus, in particular into the control unit.

In operation, at first the support 10 is lowered by a distance corresponding to the desired layer thickness in order to apply a building material layer in powder form. At first, the recoater 16 moves to the storage container 14 and receives from it an amount of the building material 15 sufficient for the application of a layer. Then it moves across the build area 8 and applies there a thin layer of the building material 15 in powder form on the building support or on an already previously existing powder layer. Preferably, the application is effected across the total cross-section of the object 2 to be manufactured, preferably the total build area 8, meaning the area limited by the container wall 6. Optionally, the building material 15 in powder form is heated to a work temperature by means of a radiant heater 17. Then, the cross-section of the object 2 to be manufactured is scanned by the laser beam 22 so that the building material 15 in powder form is solidified at positions that correspond to the cross-section of the object 2 to be manufactured. In the process, the powder grains at these positions are partially or completely melted by the energy input by the radiation, so that after a cooling-down they exist connected to each other as a solid body. These steps are repeated until the object 2 is finished and can be taken out of the process chamber 3.

Though the present invention has been described based on a laser sintering or laser melting apparatus, it is not limited to laser sintering or laser melting. It can be applied to arbitrary methods for an additive manufacture of a three-dimensional object by a layer-wise application and selective solidification of a building material. The specific setup of a laser sintering or laser melting apparatus shown in FIG. 3 therefore is only exemplary for the present invention and can of course be altered, in particular when using another exposure device as the one that is shown.

The energy input unit can for example comprise one or more gas or solid-state lasers or any other laser types such as laser diodes, in particular VCSEL (Vertical Cavity Surface Emitting Laser) or VECSEL (Vertical External Cavity Surface Emitting Laser) or a line of these lasers. In general, any unit by which energy can be selectively applied onto a layer of the building material in the form of wave radiation or particle radiation, can be used as energy input unit. For example, instead of a laser, a different light source, an electron beam or any other energy source or radiation source can be used that is suited to solidify the building material. Instead of deflecting a beam, the energy can be supplied to the building material also by means of a line exposure device or a mask exposure.

Figure 7:
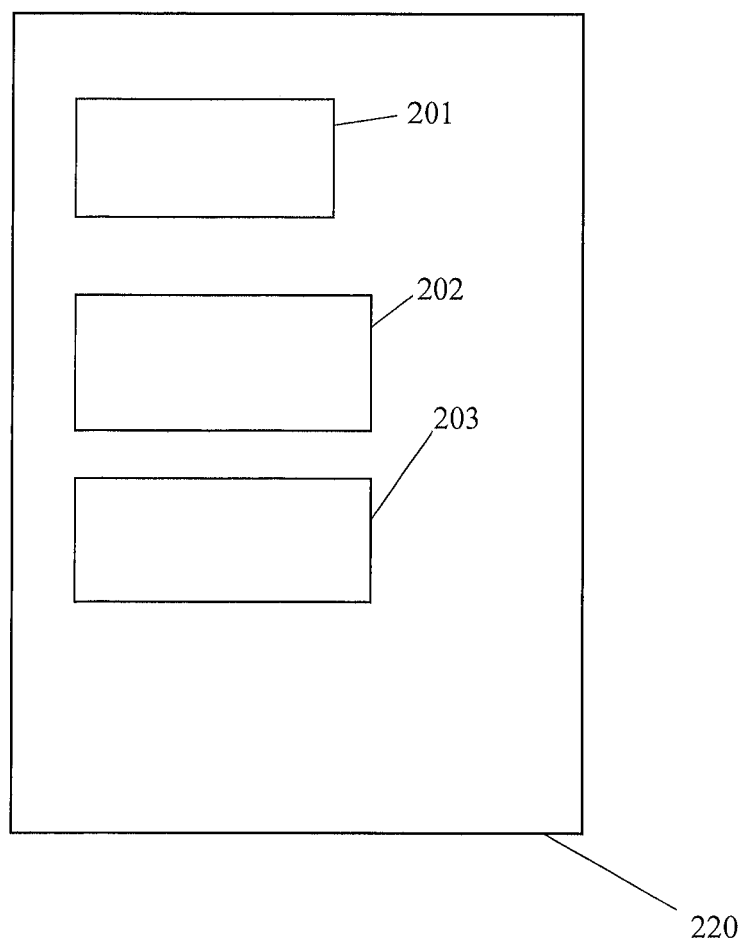
Figure 8:
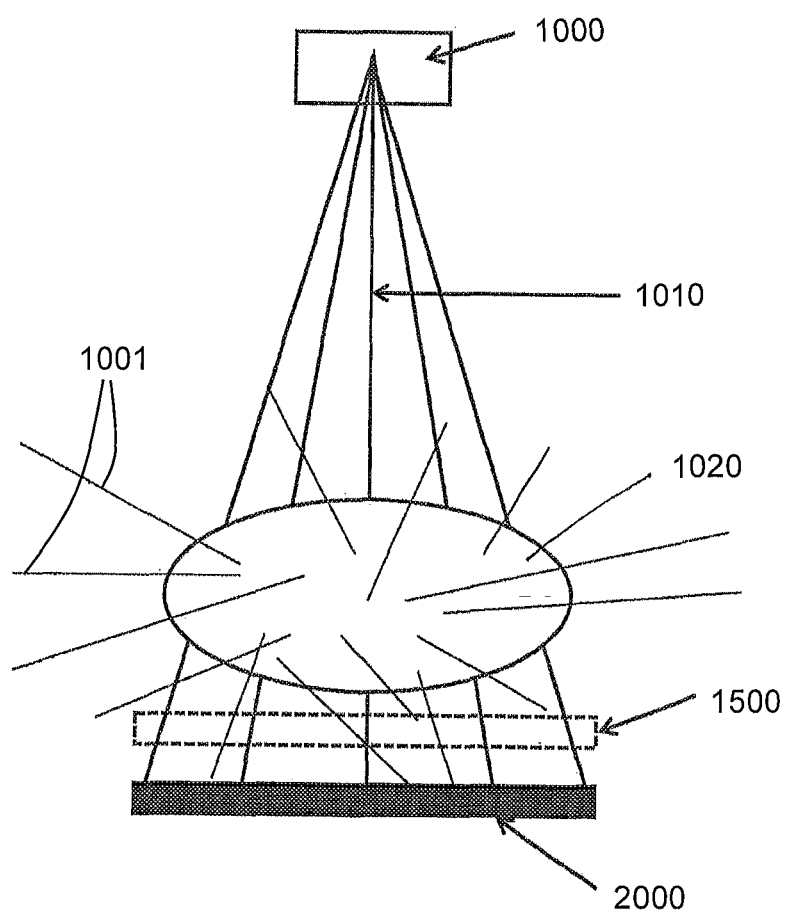
Figure 9:
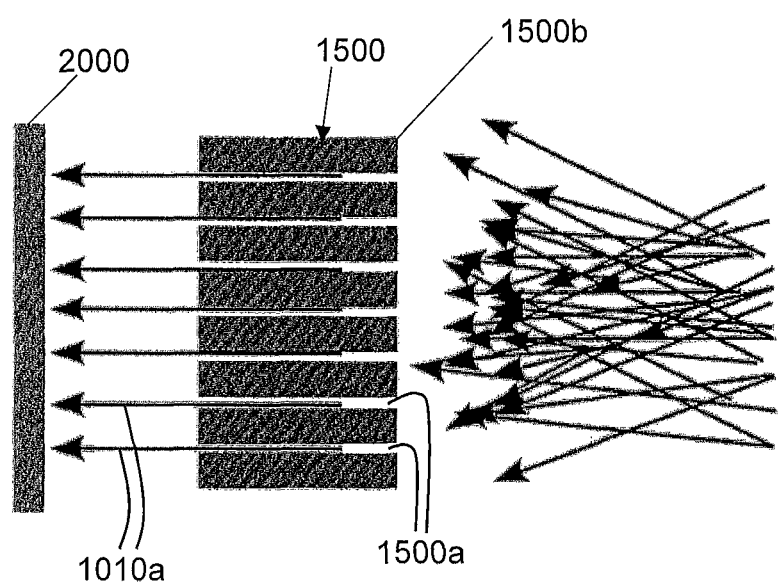

FIG. 7 schematically shows a device 220 for an inventive provision of a control command set. On the one hand, the device 220 in FIG. 7 can be a constituent of the control unit 29, for example as software module that is installed in the control unit 29, on the other hand, the device 220 may also be a module separated from the control unit 29 which is connected to the control unit 29 for a data exchange. Furthermore, the device 220 need not be a spatial constituent of the additive manufacturing apparatus, but rather may be located also outside of the same, for example as software module that is installed on a data processing apparatus that is connected to the additive manufacturing apparatus via a data connection.

To begin with, the device 220 for providing a control command set comprises a provision unit 201, which in operation provides a parameter set consisting of a limited number of parameters and a construction rule that is suitable to geometrically describe the at least one object. The term "provision" means that the provision unit 201 reads the parameter set and the construction rule for example from a memory and/or receives them from an input device at which a user inputs corresponding data. A data input device at which a user can input the parameter set and/or the construction rule either may be present at the additive manufacturing apparatus or may be spatially separated from the additive manufacturing apparatus, however be connected to the same and in particular to the device 220 via a data link. The precise implementation of the data input interface can be made in the usual way, in particular also with the help of graphical elements on a viewing screen.

Furthermore, the device 220 for providing a control command set comprises a layer model generation unit 202, which in operation generates a computer-based layer model of the at least one object described by the parameter set and the construction rule in that for each layer the position and shape of a cross-section of the object in this layer is determined.

Finally, the device 220 comprises a control command set generation unit 203, which in operation generates a control command set for an additive manufacturing apparatus, by which command set the manufacture of the at least one three-dimensional object is implemented on the basis of the layer model. In the process, the control command set generation unit 203 accesses the layer model generated by the layer model generation unit 202.

While in FIG. 1 an anti-scatter grid is shown, the channels of which are straight-lined, it is of particular advantage if the channels are inclined with respect to the radiation source 1000 as will be explained based on FIG. 4 in the following.

Figure 4:
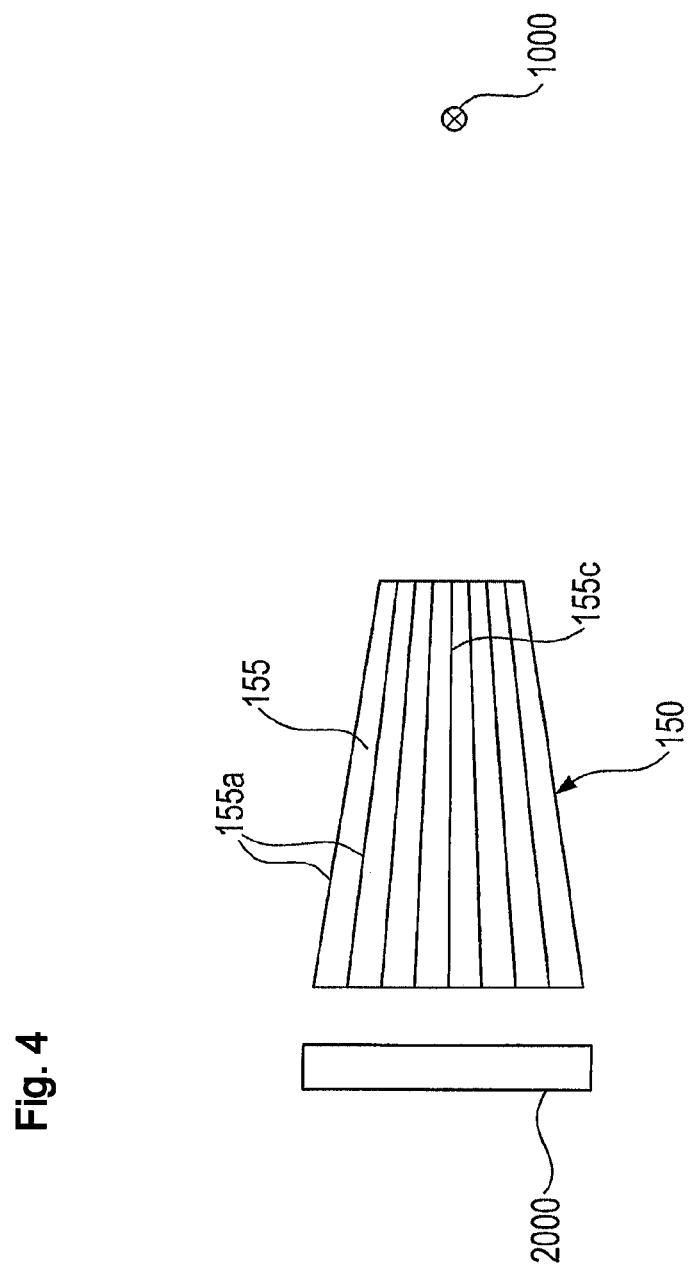

FIG. 4 very schematically shows a setup as it may typically exist in an x-ray apparatus, wherein, however, the object 1020 to be examined is not shown. FIG. 4 shows an anti-scatter grid 150 between an x-ray source 1000 and the detector 2000. For improved clarity, the walls of the anti-scatter grid running in parallel to the drawing plane are not shown. A top view of the right side of the anti-scatter grid 150 at which the radiation enters the same would be very similar (nearly identical) to the view in FIG. 1. Moreover, FIG. 4 is not to scale. In practice, the distance between the x-ray source 1000 and the detector 2000 may for example be 200 mm. In practice, the height h of the anti-scatter grid 150 can for example be 20 mm.

The rays emitted by the nearly point-like x-ray source 1000 have a certain opening angle, so that they are not in parallel to each other. In order to enable these rays to penetrate the channels of the anti-scatter grid on straight lines, the walls of the anti-scatter grid 150 should be aligned according to the rays of the widening ray bundle, i.e. substantially in parallel to the same, so that the rays emitted by the x-ray source 1000 when no object 1020 is present penetrate the anti-scatter grid without interaction, if possible. In technical jargon, this is expressed by designating the walls as being "focused". Therefore, as indicated in FIG. 4, the walls 155a of the channels 155 of the anti-scatter grid 150 are not in parallel to one another but are inclined with respect to each other under a small angle. In FIG. 4, the wall 155c of the anti-scatter grid 150 lies horizontally in the drawing plane and it can be seen that different walls 155a are at different angles to the wall 155c.

Figure 5:
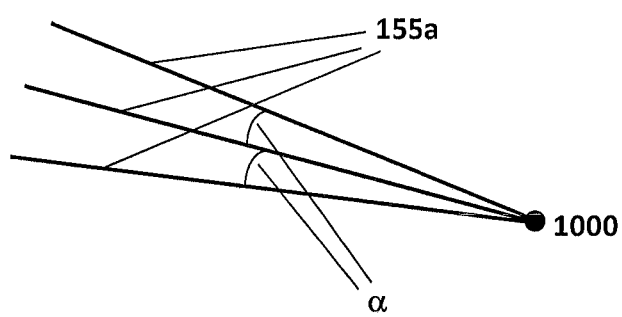

While the manufacturing of such a "focused" anti-scatter grid by means of a conventional method is complicated, from the manufacture by means of an additive manufacturing method no particular additional difficulty results in comparison to a straight anti-scatter grid. In particular, due to the inventive description of the geometry of the anti-scatter grid by means of a construction rule and a parameter set, a focused anti-scatter grid can be easily described by specifying the angle α with which the two adjacent walls are angled with respect to each other. This corresponds to a rotation of the walls about an axis of rotation which in FIG. 4 perpendicularly penetrates the drawing plane at the centre of the x-ray source 1000. The situation is schematically illustrated in FIG. 5.

It should be noted that instead of or additionally to an angle between two adjacent walls in FIG. 4, in the anti-scatter grid 150 there may exist an angle differing from 0° also between adjacent walls that are perpendicular to the walls 155a. If in the drawing plane of FIG. 4 one did look onto the anti-scatter grid 150 from above or from below, in that case one would end up at a view that is substantially similar to the view of FIG. 4. The view would be identical if the angle between two adjacent walls was the same as in FIG. 4, which, however, need not necessarily be that way.

Furthermore, in FIGS. 1 and 4 the beam entrance areas and beam exit areas of the corresponding anti-scatter grids are shown to be plane. However, this need not be so. Depending on the problem, the channels 155 of the shown anti-scatter grids could e.g. have different heights h. Alternatively or additionally, the beam entrance area (meaning the side of the anti-scatter grid facing the radiation source) could be concave and/or the beam exit area (meaning the side of the anti-scatter grid facing the detector) could be convex. For example, the arrangement of the channels 155 having the same height (or not having the same height) might be such that the ends of the channels 155 facing the radiation source all have the same distance to the radiation source. This applies to FIG. 4 but also for the case of FIG. 1.

For the manufacture of the anti-scatter grid in an additive manufacturing apparatus different particular approaches are possible which may also be arbitrarily combined with each other:

In order to obtain very thin walls, i.e. line-shaped elements, in the manufacture of the anti-scatter grid the building material in the area of the walls can be solidified by choosing the beam diameter of the area of incidence on the building material layer of a beam used for the solidification to be substantially equal to the wall thickness. In such a case, very small wall thicknesses can easily be realised. By moving the energy or laser beam on a straight line along a wall, the wall across-section can be solidified by moving it once along the wall cross-section. In particular, a straight-lined move is possible, because there don't exist corner points of a triangulation that would lead to a "zigzag" movement as a result of the inventive description of the wall by means of a construction rule and a parameter set. Accordingly, a wall having a uniform thickness can be realised.

In the just-described manufacture of thin walls, the wall thickness is determined substantially by the radiation energy supplied to the building material per unit area and/or the dimension of the area of incidence of the beam perpendicularly to the direction of movement of the beam. For example, for a given dimension of the area of incidence of the beam perpendicular to the direction of movement of the beam, the irradiance can be adjusted in order to adjust the energy input into the building material in the area of the wall cross-section and thus the thickness of the wall. However, it is also possible to use a beam having an area of incidence the diameter of which is smaller than the intended wall thickness. Such a beam then is moved across the positions of a building material layer corresponding to the wall not only once, but several times, for example two times or three times. By passing multiple times across the building material, more energy is input into the material and accordingly also the thickness of the wall increases.

Thus, in summary, wall thicknesses inside of an object can be easily varied by a change of the beam diameter or of the irradiance or by a repeated irradiation. In particular, this also applies to very delicate or thin walls.

Furthermore, in the additive manufacture of an anti-scatter grid, the latter may be oriented such that during the manufacturing the channels are vertically aligned, meaning are substantially perpendicular to the building plane. In the latter case, also support structures for the walls of the anti-scatter grid can be easily manufactured, wherein the support structures make a connection between the anti-scatter grid and the building platform in the additive manufacturing apparatus. Here, support structures of walls can also be formed wall-like, however, with a larger wall thickness than the walls of the anti-scatter grid to be supported. This is advantageous as the support structures have to carry the weight of the anti-scatter grid to be manufactured.

Figure 6:
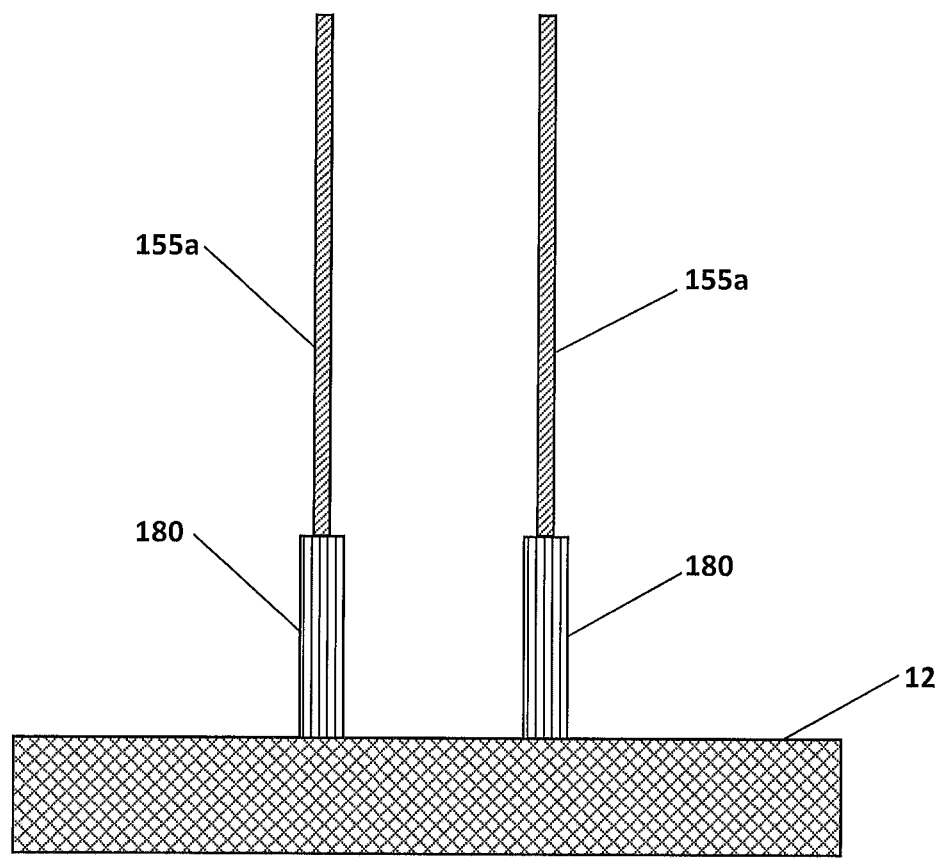

FIG. 6 illustrates such an approach. In FIG. 6, a vertical cross-section of two walls 155a of an anti-scatter grid is shown perpendicularly to the walls, which are supported by support walls 180 that are arranged on the building platform 12. Here, again the larger wall thickness of the support structure can be realised by the already described measures such as an adjustment of the irradiance, of the diameter of the area of incidence of the beam when solidifying, etc. It should be noted that the described approach is also applicable to focused anti-scatter grids. In that way, the latter can be arranged in the additive manufacturing apparatus such that at least the central channels, meaning the channels lying at the centre in the entrance surface for the x-ray radiation, are vertically aligned, i.e. perpendicular to the building plane 7.

If in the manufacture of an anti-scatter grid in a laser sintering or laser melting apparatus the anti-scatter grid 150 is arranged such that the channels 155 are perpendicular to the building plane 7 or (for a focused anti-scatter grid) at least some channels 155 are perpendicular to the building plane 7, it is of advantage when the anti-scatter grid 150 is arranged below the beam deflection device as centrally as possible, preferably such that the beam deflection device (in the same way as later the radiation source 1000) is located centrally above the anti-scatter grid to be manufactured. However, this does not mean that the beam deflection device should have the same distance to the anti-scatter grid to be manufactured as the (x-ray) radiation source 1000 when the anti-scatter grid is utilised. Rather, this refers to the the arrangement of the beam deflection device in a plane that is substantially parallel to the building plane 7. By such an arrangement of the anti-scatter grid during the manufacture, the symmetry of the anti-scatter grid in its use in an x-ray apparatus is increased, which lowers distortions of the structures to be imaged by means of the x-ray radiation.

Of course, an anti-scatter grid to be manufactured according to the invention can also have other geometries than the one specifically described further above, for example a different height or different dimensions of a channel cross-section.

What is claimed:

1. A method of manufacturing at least one three-dimensional object by an additive manufacturing apparatus, wherein in the additive manufacturing apparatus the at least one object is manufactured layer by layer by solidifying a building material at positions corresponding to a cross-section of the object in a respective one of a plurality of layers, wherein the additive manufacturing apparatus is driven by a control command set provided by the following method:
   providing a parameter set consisting of a number of parameters and a construction rule that is suitable to geometrically describe at least one portion of the object by the parameter set as a number of line-shaped elements or area elements in space, wherein the geometrically described portion of the object is made up only of the line-shaped elements at least within one of the layers;
   generating a computer-based layer model of the portion of the object in each of the layers by determining the position and shape of the cross-section of the portion of the object in each of the layer;
   generating the control command set for the additive manufacturing apparatus by which the manufacture of the portion of the object is implemented based on the computer-based layer model; and
   supplying heat energy to the building material by an electromagnetic ray bundle or particle ray bundle, thereby solidifying the cross-section by scanning the line-shaped element(s) in a direction of the line with the electromagnetic ray bundle or particle ray bundle,
   wherein a width of the line-shaped element after its solidification is adjusted by adjusting a mean energy density per unit area in an area of incidence of the ray bundle and/or by adjusting a dimension of the ray bundle in a direction of the width of the line-shaped element and/or by adjusting a velocity with which the electromagnetic ray bundle or particle ray bundle scans the line-shaped element(s) in the direction of the line; and
   wherein the computer-based layer model is generated without accessing a volume model, area model or edge model of the portion of the object.

2. The method according to claim 1, wherein for at least one of the layers the position and shape of the cross-section of the portion of the object in the at least one layer is determined only after the start of the manufacturing method.

3. The method according to claim 1,
   wherein the electromagnetic ray bundle or particle ray bundle incident onto the building material has a maximum diameter equal to or smaller than 500 µm.

4. The method according to claim 3, wherein a powder containing a polymer is used as the building material and the electromagnetic ray bundle is generated by a carbon monoxide laser.

5. The method according to claim 3, wherein a powder containing a metal and/or powder containing a ceramic is used as the building material and the electromagnetic ray bundle or particle ray bundle acts on the building material such that a conduction welding process is effected.

6. The method according to claim 3, wherein the ray bundle or particle ray bundle incident on the building material has a maximum diameter that is equal to or smaller than 30 µm.

7. The method according to claim 1, wherein the construction rule specifies a shift for one or more times of the line-shaped element or area element in a first direction in space and/or in a second direction in space that is perpendicular to the first direction in space.

8. The method according to claim 1, wherein the construction rule specifies a rotation of the line-shaped element or area element for one or more times.

9. The method according to claim 1, wherein two of the line-shaped elements or area elements differ from one another in at least one dimension by a scale factor that is specified as a parameter.

10. The method according to claim 1, wherein at least one parameter specifies a boundary condition in the use of the finished object.

11. The method according to claim 1, wherein the portion of the object is a collimator for use in a radiation unit between a radiation source and a detector configuration, and wherein the construction rule uses for a geometrical description of the collimator the following parameters: a number of raster elements and/or a distance between the same and/or a distance of the radiation source from the detector configuration.

12. The method according to claim 11, wherein the collimator is an anti-scatter grid for the use in an X-ray unit and the raster elements are plane walls or portions of cylindrical surfaces in parallel to each other.

13. The method according to claim 11, wherein the collimator is an anti-scatter grid for the use in a medical X-ray unit and the raster elements are a plurality of rods or plane walls or portions of cylindrical surfaces, which according to the construction rule are aligned according to the rays of a ray cone emitted from the X-ray source towards the detector configuration.

14. The method according to claim 1, wherein a pulsed laser is used for the solidification of the building material.

15. The method according to claim 14, wherein a temporal and spatial variation of the beam power is effected by changing a pulse frequency and/or a pulse height and/or a duty factor of the pulsed laser.

* * * * *